United States Patent

Brakebill et al.

[11] 3,889,335
[45] June 17, 1975

[54] PRESSURE REGULATOR CONSTRUCTION AND METHOD OF MAKING THE SAME

[75] Inventors: Harold G. Brakebill; Jay L. Lewis, both of Concord; Walter J. Berleyoung, Knoxville, all of Tenn.

[73] Assignee: Robertshaw Controls Company, Richmond, Va.

[22] Filed: Nov. 29, 1973

[21] Appl. No.: 419,984

Related U.S. Application Data

[62] Division of Ser. No. 308,118, Nov. 20, 1972, Pat. No. 3,791,405.

[52] U.S. Cl. ............................................. 29/157.1 R
[51] Int. Cl. ............................................. B21d 53/00
[58] Field of Search ............. 29/157.1 R; 137/116.3, 137/494, 505.42, 530, 556.6

[56] References Cited
UNITED STATES PATENTS

| | | | |
|---|---|---|---|
| 1,361,636 | 12/1920 | Stage | 137/116.3 |
| 2,587,421 | 2/1952 | Willach | 137/530 |
| 3,357,687 | 12/1967 | Vanderpoel | 137/505.42 |
| 3,425,434 | 2/1969 | Strickland et al. | 137/116.3 |
| 3,482,591 | 12/1969 | Dufresne | 137/116.5 |

*Primary Examiner*—C. W. Lanham
*Assistant Examiner*—Dan C. Crane
*Attorney, Agent, or Firm*—Candor, Candor & Tassone

[57] ABSTRACT

A pressure regulator construction having a housing provided with a control chamber interconnected to an exhaust chamber by a valve seat controlled by a movable valve member. A compression spring acts on the valve member to tend to move the valve member in one direction relative to the valve seat. A spring retainer is movably carried by the housing and has the other end of the spring effectively acting against the same. A movable cam is carried by the housing and is operatively associated with the spring retainer to adjust the same relative to the housing and thus vary the force of the spring whereby the set point of the pressure regulator construction can be selectively set. A mounting arrangement is provided and includes a single fastening member securing the spring retainer and the cam to the housing while permitting movement therebetween.

11 Claims, 5 Drawing Figures

PATENTED JUN 17 1975 3,889,335

SHEET 1

PATENTED JUN 17 1975　　3,889,335

SHEET 2

PRESSURE REGULATOR CONSTRUCTION AND METHOD OF MAKING THE SAME

This is a division of application Ser. No. 308,118, filed Nov. 20, 1972, now U.S. Pat. No. 3,791,405.

This invention relates to an improved pressure regulator construction as well as to a method for making such a pressure regulator construction or the like.

It is well known from the U.S. patents to Kreuter et al., No. 3,550,629 and Berleyoung et al., No. 3,433,413, that in a pneumatic control system for a heat exchanger or the like a set point adjusting mechanism can be provided by a pressure regulator construction which will tend to maintain a pneumatic signal from a pneumatic source at a selected pressure to tend to maintain the output temperature effect of the heat exchanger at the temperature selected by the setting of the pressure regulator construction.

Accordingly, it is a feature of this invention to provide an improved pressure regulator for such a pneumatic control system or the like.

In particular, one feature of this invention is to provide improved means for mounting the adjusting structure for manually setting the pressure regulator construction at the desired set point thereof.

For example, one embodiment of this invention provides a housing means having a control chamber interconnected to an exhaust chamber by a valve seat. A movable valve member is provided for opening and closing the valve seat. A spring means having opposed ends has one of those ends effectively acting on the valve member means to tend to move the valve member means in one direction relative to the valve seat. A spring retainer is movably carried by the housing means and has the other end of the spring means effectively acting against the same. A cam means is movably carried by the housing means and is operatively associated with the spring retainer to adjust the same relative to the housing means and thus vary the force of the spring means whereby the set point of the regulator construction can be selectively set. A unique mounting means is provided and includes a single fastening member that secures the spring retainer and the cam means to the housing means while permitting movement therebetween. Such mounting means can comprise a leaf spring having one of the opposed ends thereof secured to the housing means by the single fastening member while the other end of the spring means bears against the spring retainer to hold the spring retainer and cam means in stacked relation on the housing means.

Accordingly, it is an object of this invention to provide an improved pressure regulator construction having one or more of the novel features set forth above or hereinafter shown or described.

Another object of this invention is to provide an improved method for making such a pressure regulator construction or the like.

Other objects, uses and advantages of this invention are apparent from a reading of this description, which proceeds with reference to the accompanying drawings forming a part thereof and wherein.

Figure 1:
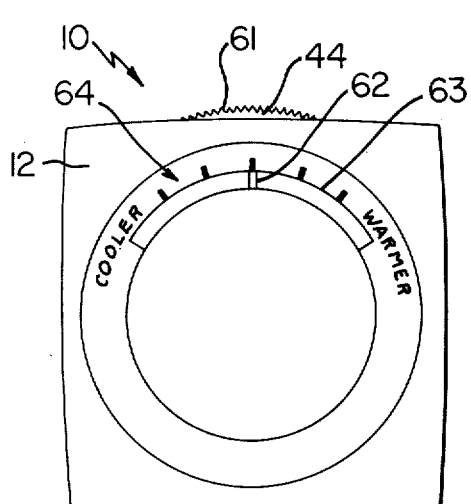
FIG. 1 is a front view of a control device containing the pressure regulator construction of this invention.

While the various features of this invention are hereinafter described and illustrated as being particularly adapted to provide a pressure regulator construction for a pneumatic control system for a heat exchanger construction or the like, it is to be understood that the various features of this invention can be utilized singly or in any combination thereof to provide a pressure regulator construction for other control systems as desired.

Therefore, this invention is not to be limited to only the embodiment illustrated in the drawings, because the drawings are merely utilized to illustrate one of the wide variety of uses of this invention.

Figure 2:
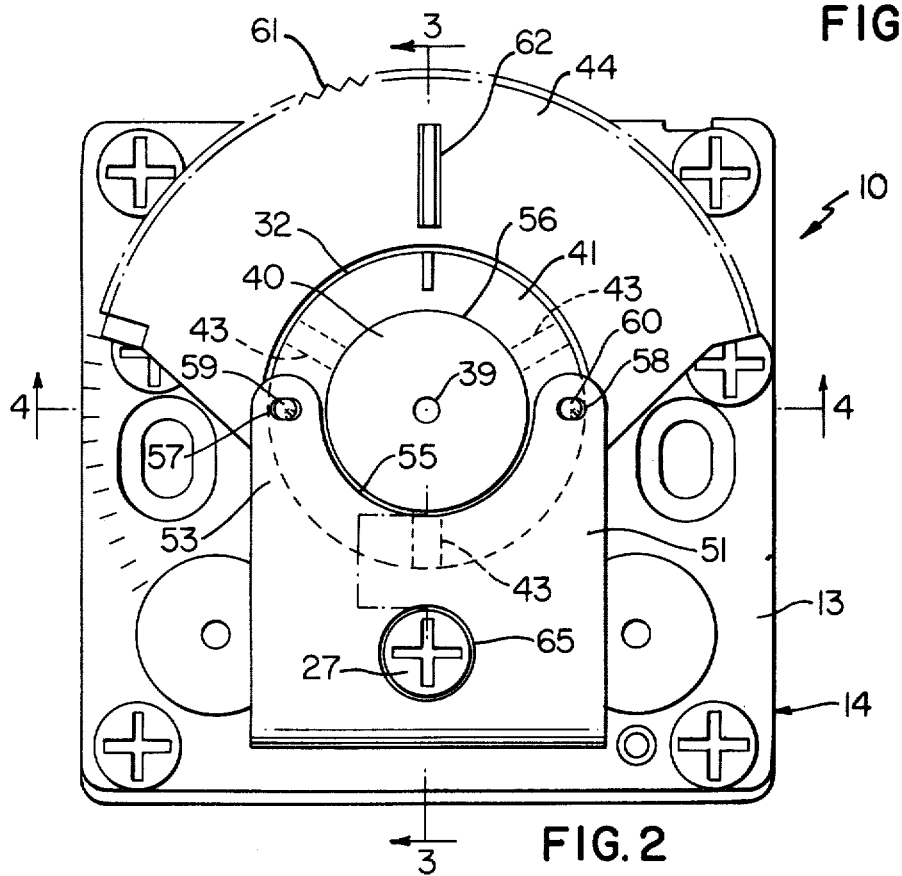
FIG. 2 is an enlarged front view of the control device of FIG. 1 with the cover member thereof removed.
Figure 4:
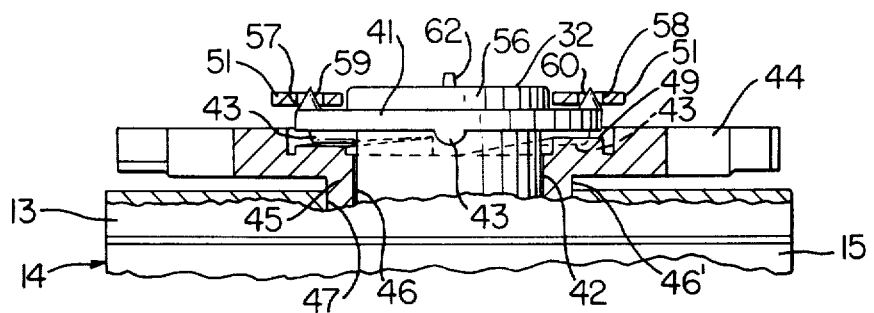
FIG. 4 is a cross-sectional view taken on line 4—4 of FIG. 2.
Figure 5:
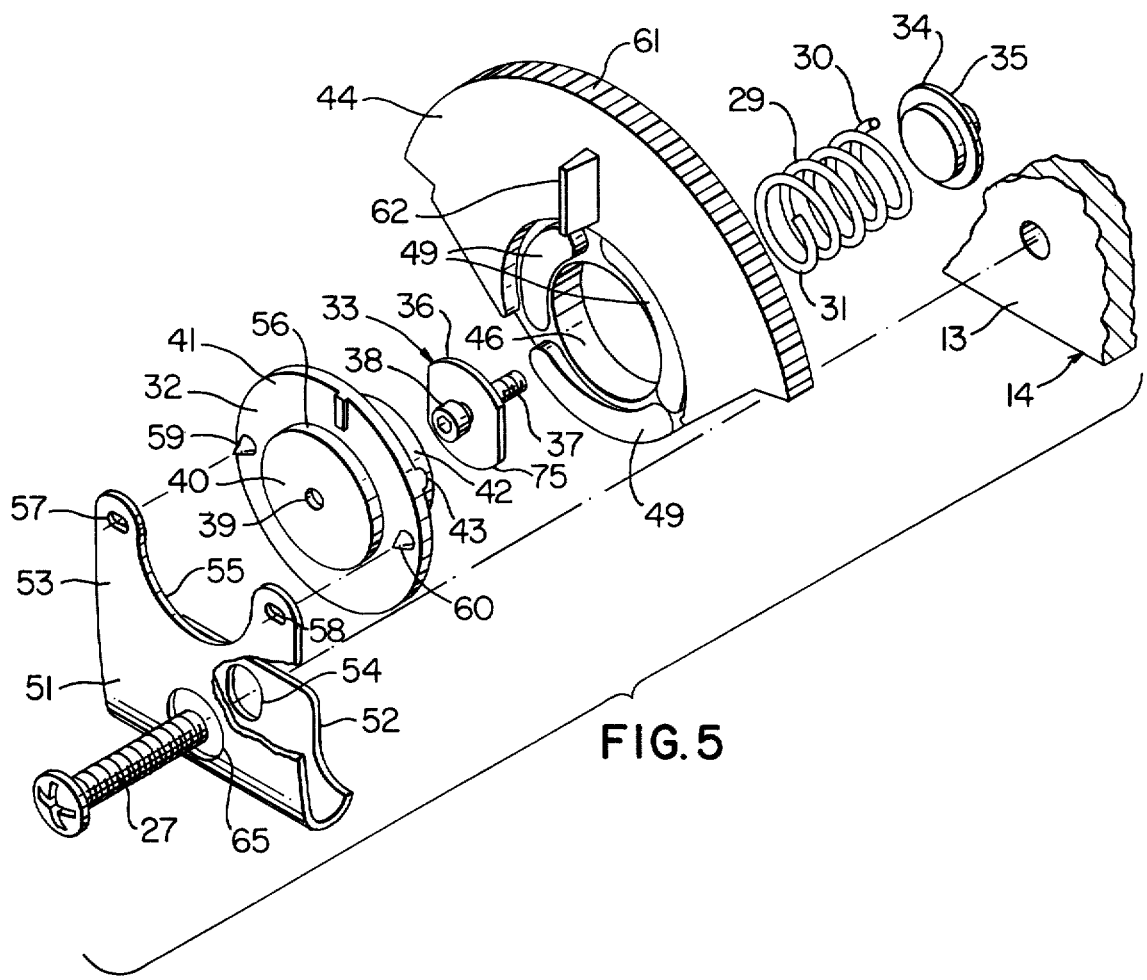
FIG. 5 is an exploded perspective view of the parts for selectively adjusting the set point of the pressure regulator construction of FIGS. 2–4.

Referring now to FIGS. 1 and 2, a control device is generally indicated by the reference numeral 10 and comprises a casing structure 11 having a front cover 12 adapted to be secured to a top plate 13 of a housing means or frame structure 14 that comprises a plurality of plates 13, 15, 16 and 17 disposed in stacked relation and suitably secured together to provide means for packaging a pneumatic control system therein such as a pneumatic control system for operating a heat exchanger means in the manner set forth in the aforementioned patents.

However, since the pneumatic control system does not form a feature of this invention and since such pneumatic control systems are fully described in the aforementioned U.S. patents, no further description of the pneumatic control system being regulated by the pressure regulator construction of this invention need be described other than to state that a chamber 18 formed in the housing structure 14 is adapted to be fed fluid under pressure from a source thereof and also be directed to a pneumatically operated device being controlled thereby so that the pressure in the chamber 18 will control the control device. Also, another chamber 19 is formed in the housing means 14 and is adapted to be supplied a biasing fluid through an aperture means 20 to provide a biasing force against a diaphragm 21 which through a transmitting member 22 transmits the fluid biasing force in the chamber 19 against a movable valve means 23 in a direction to close the movable valve means 23 against a valve seat 24 projecting into the chamber 18 whereby the biasing chamber 19 tends to close the valve seat 24 from its interconnection through a passage means 25 to an exhaust chamber 26 for a purpose hereinafter described. If desired, the biasing fluid being supplied to the fluid biasing chamber 19 can be in accordance with the output temperature effect of the heat exchanger.

In order to maintain the pressure in the chamber 18 of the housing means 14 at a desired pressure, adjustable means of this invention are provided and are secured to the housing means 14 by a single threaded fastening member 27 in a manner hereinafter described so that a pressure regulator construction is actually provided for the device 10 and is generally indicated by the reference numeral 28 in the drawings, the pressure regulator construction or set point adjustor 28 including the housing means 14, valve seat 24, valve member 23, and chambers 18 and 26 will be apparent hereinafter.

A compression spring 29 is provided to tend to open the valve member means 23 away from the valve seat 24 by effectively having one end thereof 30 bearing against the valve means 23 and the other end 31 thereof effectively bearing against a spring retainer 32 carrying an adjustable nut assembly 33 in a manner hereinafter set forth.

The end 30 of the compression spring 29 actually bears against a disc portion 34 of a transmitting member 35 that projects through the valve seat 24 and engages the valve member means 23 while being loosely received in the passage 25 so that when the transmitting means 35 under the force of the compression spring 29 and the force of the fluid in the chamber 18 opens the valve member means 23 away from the valve seat 24 in opposition to the force of the fluid in the biasing chamber 19, fluid pressure in the valve chamber 18 can bleed through the passage 25 to the exhaust chamber 26 and thereby reduce the pressure in the chamber 18 as will be apparent hereinafter.

The other end 31 of the compression spring 29 actually bears against a disc-like portion 36 of a nut member 75 of the adjusting nut assembly 33 that is threadedly disposed on a threaded stem 37 having an enlarged head 38 disposed in a stepped bore 39 of an end wall 40 of the spring retainer 32 so that the force of the compression spring 29 in effect bears against the end wall 40 of the spring retainer 32. However, the force of the spring 29 can be adjusted by the nut assembly 33 for calibration purposes. But, during the set point adjustment of the regulator construction 28, the spring retainer 32 is moved axially relative to the housing means 14 for set point adjustment purposes as will be hereinafter described to thereby set the force of the compression spring 29 tending to open the valve means 23 away from the valve seat 24 in opposition to the force of the fluid in the biasing chamber 19 whereby the pressure in the chamber 18 is adapted to be regulated by the pressure regulator construction 28 and can be set to be a certain valve when the force of the pressure in the biasing chamber 19 is at a certain valve.

The spring retainer 32 has an annular flange 41 extending from a cylindrical side wall 42 thereof and having a plurality of radially disposed projections 43 formed thereon to provide a cam following function as will be apparent hereinafter, the projections 43 having an arcuate surface to reduce friction contact as will be apparent hereinafter and being disposed in a circular array on the flange 41.

An adjustable cam member 44 is provided and has a cylindrical hub 45 provided with an opening 46 passing therethrough and being adapted to telescopically receive the cylindrical side wall means 42 of the spring retainer 32 therein while the outer peripheral surface 46' of the hub 45 of the cam member 44 is adapted to be received in a bore 47 formed in the housing means 14 and rest against a flat surface 48 forming an annular shoulder at the opening 47. The cam member 44 is a sector member and has a plurality of cam rises 49 formed in circular array thereon about the hub 45 and being equal in number to the cam follower projections 43 of the spring retainer 32 so as to be respectively in contact therewith for a purpose hereinafter described.

A mounting means of this invention is generally indicated by the reference numeral 50 in the drawings and includes the single fastening member 27 for holding and securing the spring retainer 32 and cam member 44 in place.

Figure 3:
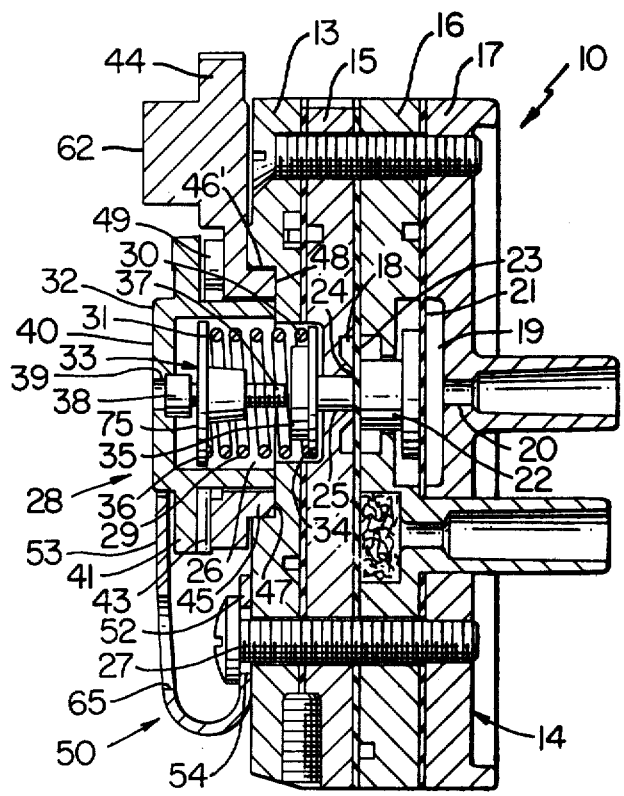
FIG. 3 is a cross-sectional view taken on line 3—3 of FIG. 2.

In particular, the mounting means 50 includes a leaf spring 51 having opposed ends 52 and 53 with the leaf spring 51 being reversely bent upon itself as illustrated so that the threaded fastening member 27 can pass through an opening 54 in the end 52 thereof and hold the end 52 to the housing means 14 as illustrated in FIG. 3. The other end 53 of the leaf spring 51 is provided with an arcuate cutout 55 so as to substantially surround a cylindrical projection 56 of the end wall 40 of the spring retainer 32. The end 53 of the leaf spring 51 also has a pair of openings 57 and 58 passing therethrough outboard of the end wall projection 56 of the spring retainer 32 as illustrated in FIG. 2 with such openings 57 and 58 respectively receiving conical projections or pins 59 and 60 extending outwardly from the annular flange 41 of the spring retainer 32 so that the end 53 of the leaf spring 51 not only provides a spring biasing force on the spring retainer 32 in a direction toward the housing means 14 at all times, but also the openings 57 and 58 thereof prevent rotational movement of the spring retainer 32 as the same is keyed thereto by the conical pins 59 and 60 that are disposed diametrically of the end cap 56 of the spring retainer 32. Thus, the force of the leaf spring maintains the spring retainer 32 and cam member 44 in stacked relation on the housing 14 while permitting movement relative thereto.

The cam member 44 is provided with a ribbed outer peripheral portion 61 that is adapted to project out of the casing 11 in the manner illustrated in FIG. 1 and permit a person to rotate the cam member 44 about the longitudinal axis of the spring retainer 32 as the cam member 44 is effectively rotatably mounted thereon by the hub 45 thereof. The cam member 44 has an indicator projection 62 formed thereon which is viewable through an arcuate window 63 provided in the casing 11 in the manner illustrated in FIG. 1 so as to indicate the set point setting of the pressure regulator construction 28 through the registration of the indicator 62 with a scale means 64 disposed on the cover 12 adjacent the window 63 thereof.

The operation of the pressure regulator construction 28 of this invention will now be described.

The operator moves the cam member 44 in either a clockwise or counterclockwise direction to set the indicator 62 thereof at the desired setting on the scale 64 adjacent the window 63 and such rotational movement of the cam member 44 causes the cam rises 49 thereof to act on the cam followers 43 of the spring retainer 32 and, thus, cause axial inward or outward movement of the spring retainer 32 relative to the housing means 14 as the case may be. Such axial movement of the spring retainer 32 varies the force of the compression spring 29 acting in a direction to tend to open the valve means 23 away from the valve seat 24 in opposition to the force of the pressure fluid in the biasing chamber 19 tending to close the valve means 23 against the valve seat 24.

Thus, once the cam member 44 has been set at the desired set point setting thereof and should the fluid pressure in the chamber 18 exceed the setting of the cam member 44 while the pressure in the fluid biasing chamber 19 remains constant, such increased pressure fluid in the chamber 18 acts on the valve member 23 to move the same away from the valve seat 24 so that part of the fluid pressure in the chamber 18 can be exhausted to the exhaust chamber 26 through the open valve seat 24. Thus, since the cam member 44 is always set to provide a pressure in the chamber 18 below the source pressure being supplied to the chamber 18, the amount of opening of the valve seat 24 is such that the pressure in the chamber 18 will never exceed the set pressure thereof. Conversely, should the pressure in the chamber 18 fall below the set pressure therefor when the pressure in the biasing chamber 19 is at the aforementioned constant value, the valve means 23 moves closer to the valve seat 24 to decrease the fluid bleed therefrom to the exhaust chamber 26 whereby the pressure in the chamber 18 increases to the set pressure therefor.

Of course, a lowering of fluid pressure in the biasing chamber 19 will cause the pressure in the chamber 18 to be at a lower value to balance the same and an increase in the pressure in the chamber 19 will cause the pressure in the chamber 18 to be at a higher value to balance the same than the value that will be in the chamber 18 when the pressure in the chamber 19 remains constant for the particular setting of the cam member 44.

Accordingly, it can be seen that the single fastening member 27 holds all of the movable parts of the prssure regulator construction 28 to the housing means 14 in stacked assembled relation through the unique arrangement of the leaf spring 51 which has its end 53 acting on the spring retainer 32 with the spring retainer 32 rotatably mounting the cam member 44 to the housing means 14.

Thus, it is merely a simple matter to replace these movable parts of the pressure regulator construction 28 by unthreading the threaded fastening member 27 from the housing 14 through an opening 65 formed through the upper portion of the bent leaf spring 51 whereby the spring retainer 32, cam member 44, compression spring 28 and spring transmitting member 35 can be readily removed from housing means 14 so that new parts can be replaced therefor if desired.

While the movable valve means 23 has been illustrated as a diaphragm or gasket member between the housing plates 15 and 16, it is to be understood that a separate valve member can be provided in the housing means 14 if desired.

Further, while various parts of the pressure regulator construction 28 of this invention have been illustrated with particular shapes, it is to be understood that the same could be modified as desired.

Therefore, it can be seen that this invention not only provides an improved regulator construction, but also this invention provides an improved method for making such a pressure regulator construction or the like.

While the form and method of this invention now preferred have been described and illustrated as required by the Patent Statute, it is to be understood that other forms and methods can be utilized and all still come within the scope of the appended claims.

We claim:

1. A method for making a pressure regulator construction provided with a housing means having a control chamber interconnected to an exhaust chamber by a valve seat and with a movable valve member means for opening and closing said valve seat comprising the steps of disposing a spring means in said housing means so as to have one end thereof effectively act on said valve member means to tend to move said valve member means in one direction relative to said valve seat, disposing a spring retainer to be movably carried by said housing means and have the other end of said spring means effectively act against the same, disposing cam means to be movably carried by said housing means and be operatively associated with said spring retainer to adjust the same relative to said housing means and thus vary the force of said spring means whereby the set point of said regulator construction can be selectively set, securing said cam means and said spring retainer to said housing means with a mounting means that includes a single fastening member securing said spring retainer and said cam means to said housing means while permitting said movement therebetween, said spring retainer being axially movable along a longitudinal axis thereof relative to said housing means, said cam means being rotatable about said longitudinal axis, forming an annular flange means on said spring retainer, and forming cam surface means on said cam means so as to be disposed between said housing means and said flange means to act on said flange means to axially adjust said spring retainer relative to said housing means.

2. A method for making a pressure regulator construction as set forth in claim 1 and including the steps of forming a plurality of cam followers on said flange means so as to be disposed thereon in circular array, and forming said cam surface means to provide a plurality of like cam rises disposed thereon in circular array and being disposed in alignment with said cam followers to respectively act thereon.

3. A method for making a pressure regulator construction provided with a housing means having a control chamber interconnected to an exhaust chamber by a valve seat and with a movable valve member means for opening and closing said valve seat comprising the steps of disposing a spring means in said housing means so as to have one end thereof effectively act on said valve member means to tend to move said valve member means in one direction relative to said valve seat, disposing a spring retainer to be movably carried by said housing means and have the other end of said spring means effectively act against the same, disposing cam means to be movably carried by said housing means and be operatively associated with said spring retainer to adjust the same relative to said housing means and thus vary the force of said spring means whereby the set point of said regulator construction can be selectively set, securing said cam means and said spring retainer to said housing means with a mounting means that includes a single fastening member securing said spring retainer and said cam means to said housing means while permitting said movement therebetween, forming said spring retainer with an adjustable part carried thereby that bears against said other end of said spring means, forming said adjustable part of said spring retainer with a threaded member threadedly disposed on a threaded adjusting screw, and disposing an enlarged head of said screw so as to bear against said spring retainer.

4. A method for making a pressure regulator construction provided with a housing means having a control chamber interconnected to an exhaust chamber by a valve seat and with a movable valve member means for opening and closing said valve seat comprising the steps of disposing a spring means in said housing means so as to have one end thereof effectively act on said valve member means to tend to move said valve member means in one direction relative to said valve seat, disposing a spring retainer to be movably carried by said housing means and have the other end of said spring means effectively act against the same, disposing cam means to be movably carried by said housing means and be operatively associated with said spring retainer to adjust the same relative to said housing means and thus vary the force of said spring means whereby the set point of said regulator construction can be selectively set, securing said cam means and said spring retainer to said housing means with a mounting means that includes a single fastening member securing said spring retainer and said cam means to said housing means while permitting said movement therebetween, and forming said mounting means from a spring member that bears against said spring retainer and is secured to said housing means by said single fastening member.

5. A method for making a pressure regulator construction as set forth in claim 4 and including the step of forming said single fastening member from a threaded fastening member threaded to said housing means.

6. A method for making a pressure regulator construction as set forth in claim 4 and including the step of forming said spring member from a leaf spring.

7. A method for making a pressure regulator construction as set forth in claim 6 and including the step of disposing one end of said leaf spring so as to bear against said spring retainer, and securing the other end of said leaf spring to said housing means with said single fastening member.

8. A method for making a pressure regulator construction as set forth in claim 7 and including the step of reversely bending said leaf spring between said opposed ends thereof.

9. A method for making a pressure regulator construction as set forth in claim 7 and including the step of forming said one end of said leaf spring so as to prevent rotational movement of said spring retainer.

10. A method for making a pressure regulator construction as set forth in claim 9 and including the steps of forming said spring retainer with a plurality of projections extending therefrom, and forming one end of said leaf spring so as to have a plurality of openings therein respectively receiving said projections of said spring retainer to thereby prevent rotational movement of said spring retainer relative to said housing means.

11. A method for making a pressure regulator construction as set forth in claim 10 wherein only two of said projections extend from said spring retainer and including the step of disposing said projections so as to be diametrically disposed relative to said spring retainer.

* * * * *